Feb. 27, 1968  M. MAYRATH ETAL  3,371,183
APPARATUS FOR FABRICATING WELDED WHEEL ASSEMBLY
Original Filed Oct. 14, 1960  3 Sheets-Sheet 1

INVENTORS:
M. MAYRATH &
BY W. E. SINCLAIR

ATT'Y.

Feb. 27, 1968  M. MAYRATH ETAL  3,371,183
APPARATUS FOR FABRICATING WELDED WHEEL ASSEMBLY
Original Filed Oct. 14, 1960  3 Sheets-Sheet 2

INVENTORS:
M. MAYRATH &
W. E. SINCLAIR
BY Homer R. Montague
ATTORNEY

Feb. 27, 1968  M. MAYRATH ETAL  3,371,183
APPARATUS FOR FABRICATING WELDED WHEEL ASSEMBLY
Original Filed Oct. 14, 1960  3 Sheets-Sheet 3
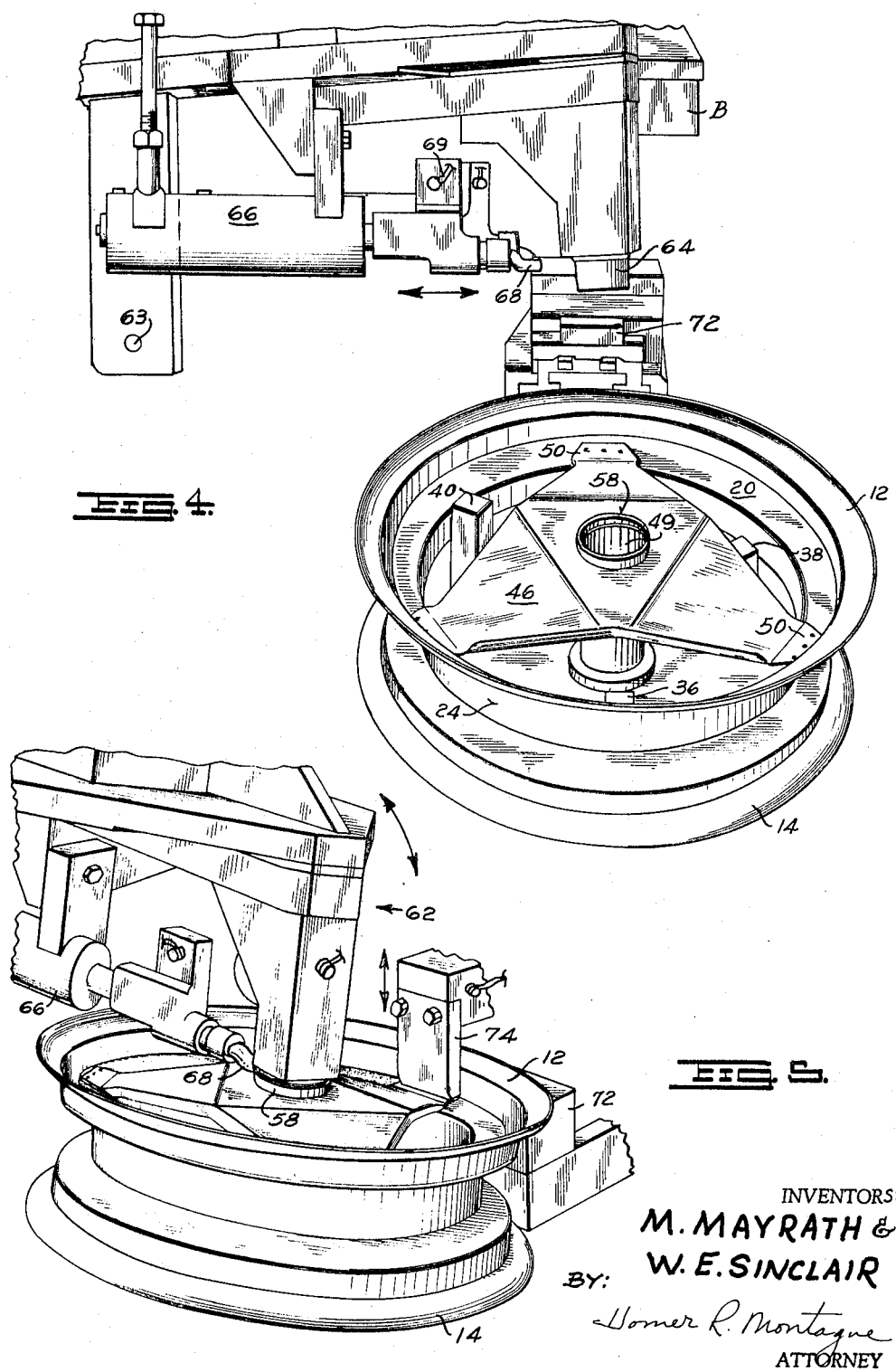
INVENTORS:
M. MAYRATH &
W. E. SINCLAIR
BY: Homer R. Montague
ATTORNEY 3,371,183
APPARATUS FOR FABRICATING WELDED
WHEEL ASSEMBLY
Martin Mayrath, Dallas, Tex., and Wayne E. Sinclair, Compton, Ill., assignors to Mayrath Company, a corporation of Illinois
Original application Oct. 14, 1960, Ser. No. 62,758. Divided and this application July 18, 1966, Ser. No. 590,121
3 Claims. (Cl. 219—78)

ABSTRACT OF THE DISCLOSURE

Apparatus and process for fabricating metal wheels of superior flatness and concentrically from a pre-formed doubly-flanged but welded rim, a tubular hub element, and a pair of three-armed spiders, whose tips are stagger welded to the respective flanges, and at their centers are welded to the ends of the hub. The apparatus includes a swinging and rotatable table having fixtures for supporting the rim and the hub in concentric relation, and a spider press for pressing one spider against the rim and hub and holding these parts under pressure while electrodes secured to the press perform spot-welding operations at the hub and at least one spider tip simultaneously. The opposite spider is similarly welded but in angularly offset relation to the first spider when the assembly has been inverted on the table. The rotating table permits the other spider tips on each flange to be welded in succession, with a single welding electrode unit.

---

This is a division of Patent No. 3,261,083, July 19, 1966.

This invention relates in general to wheel construction, and to improved apparatus for fabricating wheels for a wide variety of uses.

Although the wheel assembly illustrated and described in this application is by way of example, of a type which may be utilized for farm machinery carriages, it is to be understood that the method of fabrication, and the wheel itself described herein, are applicable for any purpose requiring a wheel of great strength, and especially one which is accurately centered and true; for example, for vehicles generally, or for use as a belt pulley or the like.

In the fabrication of large wheels or pulleys which are to sustain and transmit heavy loads, it has been the practice to roll flat metal strip stock to the proper cross-sectional shape to form the rim, with its flanges, shoulders and the like as required, and then form the wheel rim by bending the formed metal stock as around a cylindrical core or form, and butt-welding the ends to provide the circular finished rim. For the purpose of providing a support for the wheel hub bearing or bearings, spokes or spiders are then secured to the wheel and are attached thereto by any desirable means, as, for example, by spot welding or by bolts.

One disadvantatge of the method of fabrication just mentioned is that the wheel rim is usually out of round, and/or its beads are nonplanar, due to stresses developed during the rim-shaping and butt-welding operations. These stresses cannot be overcome, and the wheel truedup, by the prior art spiders or spokes and the usual methods of applying them to the rim. We have discovered that it is possible to manufacture a wheel in which such residual stresses actually contribute to the ultimate strength and resilience of the finished product, when supplemented by further permanent stresses which act to pull the distorted rim into the desired perfectly round and flat configuration.

Another disadvantage of prior art wheels fabricated in the general way heretofore employed and as described above, is that the central hub or bearing-defining member may not be accurately centered with respect to the rim, or may not be truly axial in direction. Our invention provides a wheel construction of simple and economical form which overcomes this objection.

The invention provides an improved combination assembly press and welding apparatus for carrying out the improved fabrication method claimed in Patent No. 3,261,083, whereby the novel wheel constructon can be attained using very simple shop or factory operations.

Still another object of this invention is to provide apparatus for fabricating and assembling a welded wheel which will result in a structure that is substantially distortion-free, true, and capable of supporting heavier loads than heretofore possible using equivalent gauges and weights of metal.

The way in which the foregoing and other objects and advantages of this invention are attained will become apparent when the following specification is read in conjunction with the appended drawings, in which:

FIGURE 4 shows the spider press and the hub and rim electrodes out of contact with the wheel assembly parts as positioned on the welding fixture preliminary to a pressing and welding operation.

FIGURE 5 shows the spider press and the hub and rim electrodes in contact with the wheel assembly, as during an actual welding operation.

In general, a wheel embodying this invention will be of metal in which the wheel rim with its flanges, bands, beads and so on is formed from a long flap strip of metal which, by rolling or stamping, or by other suitable operations, is modified to provide an elongated strip having a plurality of parallel longitudinal stepped areas. This strip is then bent, as well known in the art, to form a closed cylinder, and the ends of the strip are butt-welded to one another. This wheel rim is then reinforced by two identical spiders of special design which form a part of this invention, and which also provide the hub support. The two identical spiders are in the general shape of bowed or concavo-convex equilateral triangles whose apexes have been truncated or squared off. Each main edge of the spiders is reinforced as by flanging, and a circular central hole in each spider is provided with a drawn ring or collar sized to provide a drive fit with an end of a tubular hub element. The apexes are also formed with the usual dimpled projections for later use in welding the apexes to the rim flanges. The sizing of the parts, and the manner of pressing and welding the spiders to the rim and the hub element, introduce intentional stresses which give the wheel its characteristic strength, resilience and accuracy.

Figure 1:
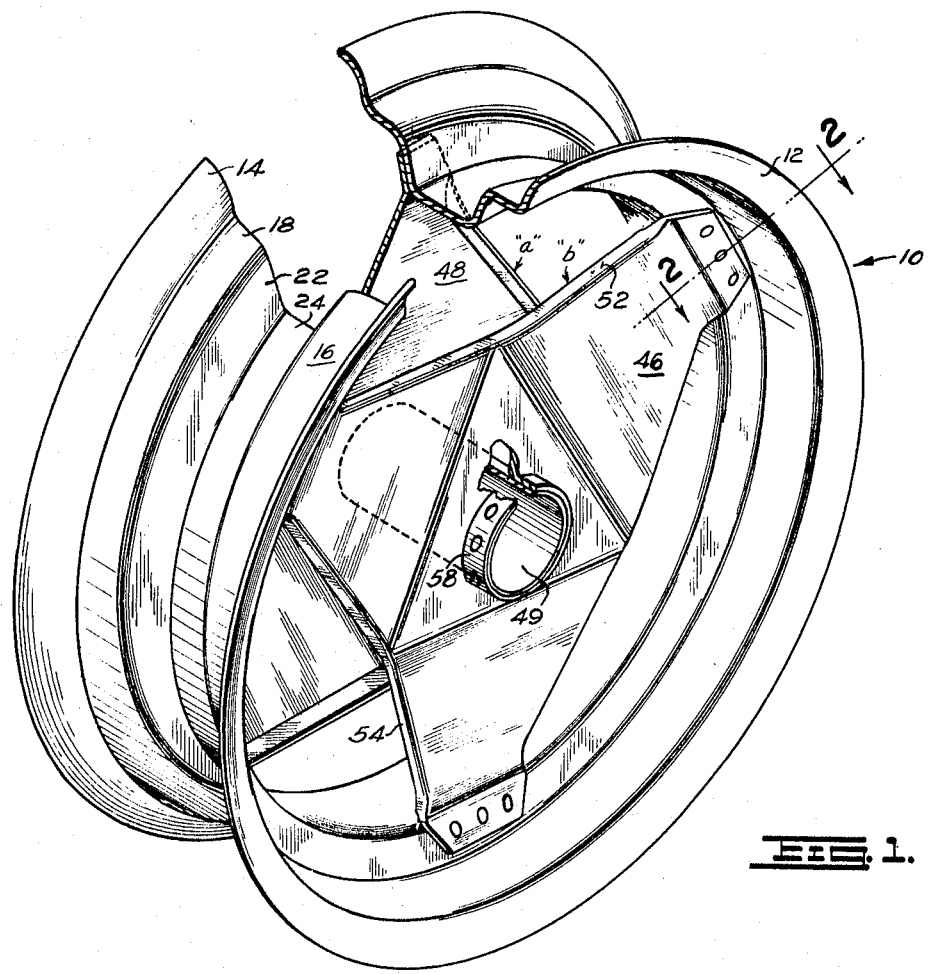
FIGURE 1 is a perspective view, partially broken away and in section, of a completed wheel embodying the invention.
Figure 2:
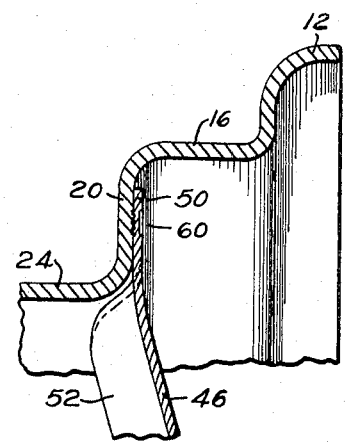
FIGURE 2 is a fragmentary sectional view taken on line 2—2 of FIGURE 1.

Referring now to FIGURES 1 and 2 of the drawings, reference number 10 indicates the preformed wheel rim which was originally in flat form and which has, by rolling, stamping, or some other suitable operations, been shaped to provide the desired plurality of parallel shoulders and flanges indicated as peripheral beads 12 and 14, shoulders 16 and 18, radial bands or flanges 20 and 22, and central web 24 of the completed rim. The number of ridges, bands or shoulders to be so formed may be changed to suit the particular wheel which is to be fabricated. For example, it may be necessary only to provide a U-shaped channel (having thus two radial flanges) instead of a strip having the parts illustrated in FIGURE 1.

The shaped metal strip forming the rim 10 has then been bent into the closed annular or cylindrical shape, and the ends of the strip butt-welded to a smooth joint, as shown. However, the finished rim will not only be more or less noncircular or out-of-round, but it will not be "flat," in the sense that its beads 12 and 14 will not each lie in a common flat plane. According to the invention, this distortion is corrected by utilizing stresses imposed by the wheel spiders 46, 48 connected by the bearing or hub element 49.

Since the two triangular shaped spiders 46, 48 are identical, only one of them will be described in detail. As best shown in FIGURE 1, triangular spider 46 is bowed or concavo-convex in shape with the convex side facing outward of the wheel assembly and with the apex of each of the angles truncated or squared-off as shown at 50. Each side of the triangular spider 46 along the greater portion of its length has an integral bent-over flange, two of which clearly appear at 52, 54 in FIGURE 1. These bent-over flanges together with the bowed shape and the stressing provided during assembly produce a spider structure having great strength and rigidity. The triangular spider is formed with a centered circular opening therein having an upstanding hub collar portion 58 and small indentations 60 in the truncated or squared-off end portions 50. These indentations form small projections on the opposite surface of the material for contacting the radial band or flange on the wheel rim.

A bearing sleeve or hub element 49 is tightly received in and welded to the respective spider hub collars 58, in a manner to be described below, to complete the wheel assembly.

Figure 3:
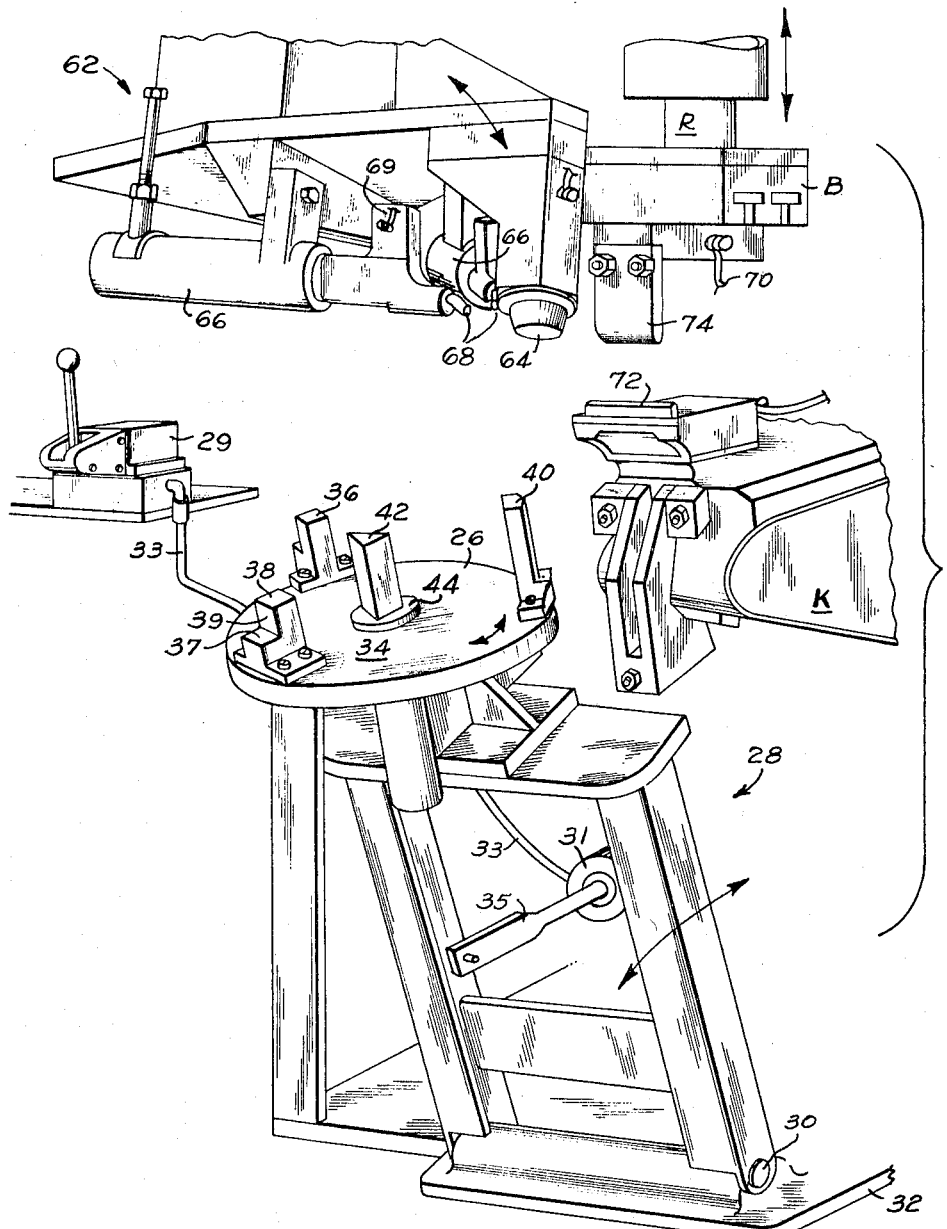
FIGURE 3 is a fragmentary perspective view of the pivoted welding table fixture, its associated spider press and the hub-welding and spider rim welding electrodes, with certain operating portions of the machine.

In order to utilize an untrue rim to produce a wheel having its rim truly circular and centered, and its beads truly planar, the hereinafter described method and apparatus for carrying out said method are provided, reference first being made to FIGURE 3 of the drawings. In this figure, the parts forming the apparatus are shown as associated with a conventional vertical-acting hydraulic press, only those components thereof which are relevant to the present invention being shown; other parts are omitted in the interest of simplicity and clarity of the illustration. Thus, the press includes the usual ram R carrying a tool or die mounting base B herein employed to mount a vertically moving welding electrode. It also includes the fixed knee K which carries a fixed electrode, and a main machine base such as 32.

Wheel support 26 is pivotally mounted to be rotatable about it center on a framework 28 which in turn is pivotally mounted at 30 on the base 32 of the main press to swing to and from a wheel loading and a wheel welding position. Movement of the wheel support 26 is effected by an air cylinder 31 controlled as by a valve 29, the cylinder being floatingly connected to the main press frame and its piston 35 connected to the framework 28. A control line 33 is illustrated as connecting the valve with the cylinder.

The wheel support 26 comprises a flat base member 34 on which are mounted a plurality of upstanding guiding and supporting members, three of which (36, 38 and 40) are arranged equidistantly in a circle on the wheel support 26 with their centers spaced 120° apart. Members 36 and 38 are of less height than the member 40 in order not to project through a wheel rim placed thereon as far as does the longer member 40. A fourth upstanding member 42 is located at the center of the wheel support 26 and has a flat circular bearing portion or abutment 44 at its bottom. Each one of the upstanding guiding and supporting members 36, 38 and 40 has a planar guiding and supporting horizontal surface as at 37, and a vertical guiding or locating surface such as at 39.

The above described supporting table structure 26 is provided to position a wheel rim 10 on the upstanding guide means 36, 38 and 40 in a perfectly circular configuration established by the vertical surfaces 39. The horizontal surfaces such as 37 define a common plane into which the rim will be pressed during the assembly, thereafter to be held permanently by the spider and hub element portions of the final wheel. The rim 10 is placed on and about the guides 36, 38 and 40 manually, being pressed down to force the relatively flexible rim into circular shape. If the deformity happens to be so oriented that the wheel drops into place, the operator will rotate it so as to bring it into a position where some force is needed to press it into its seated position on the guides. It will be understood that the peripheral length of the rims is held to an accurate value, this being an incident of the length-cutting operation initially performed on the rim stock before it is butt welded to form the rim.

A bearing sleeve or hub element 49 of tubular form, cut to accurate length, is then placed over the centrally positioned guiding and supporting member 42 where its bottom edge rests on the flat circular bearing surface 44. Bearing sleeve 49 has a length greater than the width of the central web 24 of the wheel rim and preferably a length greater than the distance between the radial bands or flanges 20 and 22, but less than the distance between the peripheral beads 12 and 14 of the wheel rim.

A first spider 46 is then placed with its central hub collar 58 upon the top of the bearing sleeve 49 and resting on it. In the formation of the collar 58 by a drawing operation incident to the production of the spider, there will be a radius or fillet around the collar opening, which aids in the locating of the spider upon the bearing sleeve, and keeping it in centered position when the wheel support 26 is swung into pressing and welding position. FIGURE 4 of the drawings shows the parts with the rim seated on the wheel support and spider 46 resting on top of the bearing sleeve, but with the wheel support not yet swung back into welding position.

Valve 29 is now operated, and cylinder 31 pulls framework 28 back (as viewed in FIGURE 3) until the wheel assembly as so far constituted is in the FIGURE 5 position; that is, with the wheel shoulder 16 stopped against the part holding fixed electrode 72. It will be noted that the framework 28 actually swings past the vertical position, so that wheel support 26 is slightly tipped backward in FIGURE 5, and the lower bead and rim parts as at 14 can clear the support for the fixed electrode on knee K.

With the parts so disposed, and with the wheel support or spider 46 rotated so that one corner of the spider is under the vertically movable electrode 74, a pressure-operated spider press 62 is actuated, as for example, by an air cylinder which can be similar to cylinder 31; the spider press 62 is thus swung bodily about a pivot axis 63 so located on the main machine frame as to bring the conically shaped end member 64 of spider press 62 into engagement with the opening or collar 58 in the spider 46 and the opening in the top of the aligned bearing sleeve 49. Operation of spider press 62 forces the spider 46 onto the bearing sleeve 49 and at the same time forces the end portions 50, and their projections (not shown) opposite the small indentations 60 of the spider 46 into firm contact with the wheel rim radial band or flange 20. Since the bearing sleeve abuts on annular surface 44 of the table fixture, the rim of press part 64 brings the outer surface of the spider flush with the upper edge of the sleeve.

While the wheel rim, spider and bearing sleeve are rigidly held in this position, a pair of duplicate air cylinders 66, spaced approximately 60 degrees apart in the substantially horizontal plane parallel to the wheel rim plane, are actuated by any conventional valve-controlled line to advance, and apply correct welding pressure to, respective welding electrode 68, which thus contact the hub collar 58. Welding current is supplied by means of electric cables such as 69, 70 connected to any suitable welding mechanism, not shown, which supplies carefully controlled welding currents for the precise intervals needed to achieve perfect welds at the points described.

In order to weld the end portions 50 of the spider 46 to the wheel flange 20, a pair of electrodes 72 and 74 are provided, the upper one being moved down by press ram R as already described. The initiation of the flow of welding current may be accomplished automatically in response to the achievement of the desired holding pressure in the cylinders 66 and in that of the main press. The welds at the wheel hub and at the spider corners may be made simultaneously or in succession, but the pressing and holding pressure is maintained during the welding cycle.

It is to be noted that the above operation produces two welds about 60 degrees apart on the hub portion of the spider, and welds only one of the three spider corner portions 50 onto the flange 20 of the wheel rim. In order to complete the welding operations on one side of the wheel rim, pressure applying electrodes 68, 68 and 74 are released and the wheel support 26 is rotated about 120 degrees to bring a second spider corner 50 into proper relation with the welding electrodes 72 and 74, which automatically brings a new region of the hub 58 of the spider into proper relation with electrodes 68. Pressure is again applied to the welding electrodes 68 and 74 and current is then applied to weld the parts together in the second position. Similarly, the assembly is again indexed to weld the parts in the third position, which completes the welding operations on one side of the wheel rim. It is apparent that instead of indexing the wheel support each time it is necessary to make an additional weld, depending on the number of corner portions on the spider being welded, a plurality of properly spaced electrodes could be placed completely around the spider hub 58 and one on each one of the ends or corners of the spider, so that all of the welds could be made at one time while the parts are held together by the pressure exerted by the spider press 62 and a press or presses for the plurality of electrodes such as 74.

After welding the spider on one wheel flange as described, the wheel support 26 is then retracted to its loading position (FIGURE 3) and the wheel rim, bearing sleeve and first spider removed and replaced upside down on the wheel support 26 so that the previously welded spider 46 is adjacent the surface of wheel support 26, or more properly, is facing the same.

To complete the wheel assembly, a second spider 48, identical to the spider 46, is placed on the flange 22 of the wheel rim with its central opening in alignment with and resting on the opposite end of the bearing sleeve 49 and with its end portions corresponding to portions 50 of spider 46 being displaced or offset 60 degrees from said end or corner portions 50 of spider 46, as clearly shown in FIGURE 1.

Proper offsetting of the corner portions 50 of one spider 48 relative to the similar corner portions 50 of the other spider 46 is facilitated by the upstanding guiding and supporting member 40 which is of greater height than the upstanding guiding and supporting members 36 and 38. The size and shape of member 40 is such that one portion contacts one flange of one of the spider members already in place and welded, when the partly finished wheel has been replaced upside down on fixture 26, so that the other spider need only be rotated until one of its flanges 52 contacts an opposite portion of member 40. These two points are designated a and b in FIGURE 1, and they may for example contact respective forward vertical corners of the member 40, whose face width thus is made to establish the desired 60 degree offset of the corners of the two spiders, for the first weld of the second spider 48.

The fixture 26 having been reloaded with the inverted partly completed wheel assembly, is again swung into welding position, the spider press 62 is swung down into locating and pressing position, and the second spider 48 is welded to the wheel flange 22 and the opposite end of the bearing sleeve 49 in exactly the same manner as the first spider 46, thus completing the wheel assembly.

The above steps of making the wheel assembly result in a wheel whose rim is perfectly circular in shape and the beads not only planar but in planes which are parallel to one another and perpendicular to the central sleeve; flanged ball bearings, for example, can merely be inserted into the ends of the sleeve to receive standard shafting or axle rods. The accuracy of the wheel is due to the manner in which the wheel rim and the spiders and bearing sleeve are rigidly held in correct position while the parts are being welded together. It is clear that since one radial flange or band of the wheel rim is held rigidly in place against the three planar guiding and supporting surfaces on the wheel support and one end of the bearing sleeve is similarly held rigidly against the abutment 44 and centered by the press part 64 while the spiders are being welded to the bearing sleeve and to the flange of the wheel rim, the original stresses tending to distort the wheel rim to an out of round shape, or to warp the beads into a non-planar condition, are, when the wheel assembly is finally removed from its clamped welding position, resisted by the rigid fastening of the parts by the welds. This puts additional tension in the metal, adding strength and increasing the resilience of the wheel.

Having described the invention in its preferred embodiment, and the preferred apparatus for making the article, we wish it to be understood that various changes can be made, by those skilled in this art, without departing from the true scope of our invention as defined in the appended claims.

What is claimed is:

1. Apparatus for fabricating a wheel assembly from a doubly-flanged endless rim which may be slightly out of round and with its beads in non-planar relation which comprises, table means having a plurality of upstanding guiding means for supporting said rim in a perfectly circular configuration, a guide member for holding a bearing sleeve in the exact center of the supported rim, a spider press for pressing a centrally apertured spider member with its opening around the end of such a bearing sleeve into contact with the bearing sleeve and outer portions of the spider into contact with a flange of the rim, and means including welding electrodes carried by said spider press for welding the bearing sleeve in the opening of the spider and for welding the outer margin of the spider on to the flange of the wheel rim while the spider press holds the spider under pressure against the bearing sleeve and the flange of the rim.

2. Apparatus for fabricating a wheel assembly from a doubly-flanged endless rim which may be slightly out of round and with its beads in non-planar relation which comprises, table means having a plurality of upstanding guiding means for supporting said rim in a perfectly circular configuration, and a guide for holding a bearing sleeve in the exact center of the supported rim, a spider press for pressing a centrally apertured spider member with its opening around the end of such a bearing sleeve into contact with the bearing sleeve and for pressing the outer portions of the spider into contact with a flange of the rim, means carried by said spider press for moving a pair of electrodes into pressure contact with the portion of the spider engaging the bearing sleeve, means carried by said spider press for moving another electrode into contact with and exerting pressure on one of the outer portions of the spider, and means for welding the spider to the bearing sleeve and to the flange of the wheel rim while the parts are held under pressure.

3. Apparatus for fabricating a wheel assembly from a doubly-flanged endless rim which may be slightly out of round and with its beads in non-planar relation, which comprises table means having a plurality of upstanding guiding means for supporting said rim in a perfectly circular configuration, and having a guide member for holding a bearing sleeve in the exact center of the supported rim, means mounting said table means for swinging movement to carry parts thereon to and away from a loading station and a pressing and welding station, a spider press mounted for movement to and away from the latter station and operative for pressing a centrally apertured spider member with its opening around the end of such a bearing sleeve into contact with the bearing sleeve and outer portions of the spider into contact with a flange of the rim, and means including welding electrodes carried my said spider press for welding the bearing sleeve in the opening of the spider and for welding the outer margin of the spider on to the flange of the wheel rim, while the spider press holds the spider under pressure against the bearing sleeve and the flange of the rim.

References Cited

UNITED STATES PATENTS

| | | | |
|---|---|---|---|
| 986,854 | 3/1911 | McIntyre | 219—78 |
| 1,310,246 | 7/1919 | Moore | 29—159.01 |
| 1,550,651 | 8/1925 | Charter | 219—124 |
| 3,143,377 | 8/1964 | Bulgrin et al. | 301—63 |
| 3,266,702 | 8/1966 | Parent et al. | 228—48 |

RICHARD M. WOOD, *Primary Examiner.*

B. A. STEIN, *Assistant Examiner.*